US012618548B1

(12) United States Patent
Hopf

(10) Patent No.: US 12,618,548 B1
(45) Date of Patent: May 5, 2026

(54) DENT REPAIR LIGHT

(71) Applicant: Steven Hopf, Boerne, TX (US)

(72) Inventor: Steven Hopf, Boerne, TX (US)

( * ) Notice: Subject to any disclaimer, the term of this patent is extended or adjusted under 35 U.S.C. 154(b) by 0 days.

(21) Appl. No.: 19/041,185

(22) Filed: Jan. 30, 2025

(51) Int. Cl.

| | |
|---|---|
| ***F21V 21/32*** | (2006.01) |
| ***F21V 21/092*** | (2006.01) |
| ***F21V 21/30*** | (2006.01) |
| ***F21V 23/02*** | (2006.01) |
| ***F21W 131/402*** | (2006.01) |

(52) U.S. Cl.
CPC ............ *F21V 21/32* (2013.01); *F21V 21/092* (2013.01); *F21V 21/0925* (2013.01); *F21V 21/30* (2013.01); *F21V 23/023* (2013.01); *F21W 2131/402* (2013.01)

(58) Field of Classification Search
CPC .... F21V 21/32; F21V 21/092; F21V 21/0925; F21V 21/30; F21V 23/023; F21W 2131/402
USPC .......................................................... 362/397
See application file for complete search history.

(56) References Cited

U.S. PATENT DOCUMENTS

| | | | | |
|---|---|---|---|---|
| 936,379 | A * | 10/1909 | Stevens | F21V 21/29 138/120 |
| 1,541,752 | A * | 6/1925 | Sampson | F21V 21/32 362/413 |
| 4,907,769 | A | 3/1990 | Hunlet, Jr. et al. | |
| 5,572,324 | A | 11/1996 | Ventura | |
| 5,954,901 | A | 9/1999 | Henderson | |
| 6,854,862 | B1 | 2/2005 | Hopf | |
| 7,182,490 | B2 * | 2/2007 | Hsu | F21V 21/092 362/396 |
| 9,109,769 | B2 | 8/2015 | Lee | |
| 9,212,793 | B1 | 12/2015 | Lee | |
| 9,291,337 | B1 | 3/2016 | Hulett | |
| 9,472,737 | B2 * | 10/2016 | Miyoshi | H10H 20/8515 |
| 9,574,719 | B1 | 2/2017 | Hulett | |
| 9,879,832 | B1 | 1/2018 | Hulett | |
| 10,674,874 | B1 | 6/2020 | Guidarelli | |
| 11,209,609 | B2 | 12/2021 | Boehm | |
| 11,241,924 | B2 | 2/2022 | Seligman et al. | |
| 11,247,095 | B2 | 2/2022 | Casagrande et al. | |
| 11,576,507 | B2 | 2/2023 | Boehm | |
| 11,846,829 | B2 | 12/2023 | Boehm | |
| 2014/0268711 | A1 | 9/2014 | Lee | |
| 2019/0016071 | A1 | 1/2019 | Mackey et al. | |
| 2020/0064590 | A1 | 2/2020 | Boehm | |

(Continued)

*Primary Examiner* — Laura K Tso

(57) ABSTRACT

The present invention is a dent repair light with a lamp used to illuminate even minor dent distortions in a vehicle body so a technician can identify and repair the dent. The dent repair light may include a support base with at least two suction cups positioned apart from one another and being movably mounted to the support base. The suction cups may be pivotally mounted to the support base by a vertical axis and a horizontal axis. A power supply may be pivotally mounted to the support base. The power supply may be connected to the lamp by way of a flexible arm, thus offering adjustable support of the lamp relative to the support base. The flexible arm may also support a wire providing electrical communication between the power supply and the lamp. The suction cups mounted apart from one another and movably mounted to the support base may allow for the support base to securely support the dent repair light on a vehicle body without causing any damage to the vehicle body.

20 Claims, 7 Drawing Sheets

(56) References Cited

U.S. PATENT DOCUMENTS

| | | | |
|---|---|---|---|
| 2020/0155890 | A1 | 5/2020 | Casagrande et al. |
| 2020/0391563 | A1 | 12/2020 | Seligman et al. |
| 2021/0278628 | A1 | 9/2021 | Boehm |
| 2022/0079355 | A1 | 3/2022 | Boehm |
| 2022/0132804 | A1 | 5/2022 | Arnoni |
| 2023/0088991 | A1 | 3/2023 | Boehm |

* cited by examiner

DENT REPAIR LIGHT

FIELD OF THE INVENTION

The present invention generally relates to utility lights and more specifically to lights used in vehicle dent repair to identify and evaluate dents in a vehicle body.

BACKGROUND OF THE INVENTION

Paintless dent removal or "PDR" is a system that allows a skilled technician the ability to remove dents in automobile bodies without the need to replace the part or even repaint the part after repair. It is easy to see how this provides a significant cost savings to the body shop, and thereby to the vehicle owner and the insurance company. To evaluate the damage and the extent of the damage to a portion of the vehicle body, the lighting is critical. A light directed from one angle may reveal surface inconsistencies where from another angle, it may not. Before a technician can begin to work to remove a dent in the vehicle body, the location, shape, and depth of the dent must first be ascertained.

In some cases, it is desirable to secure a light source adjacent to the surface of the vehicle being worked on to cast the optimal shadows to evaluate the dent. This may mean support for the light may be desired to be placed directly on the vehicle body. It is understood that the purpose of the dent removal process is to bring the physical appearance of the body of the vehicle back to as close to a new condition as possible. Therefore, it is imperative that the PDR technician does not do any damage to the surface of the vehicle body as a result of securing the light to the vehicle body. To complicate matters even more, any fastening system used to temporarily secure the light to the vehicle body must be rigidly secured to the vehicle body as the PDR process may be very physical. The PDR technician commonly must physically manipulate the dent out of the vehicle body by way of muscle power transferred through a variety of specialized tools. This process may cause bumping and shaking of the vehicle body. Anything temporarily secured to the vehicle body that shakes loose, may fall damaging the light, the vehicle body, or both. Damaging the light is undesirable. Damaging the vehicle body is unacceptable as the sole purpose of the actions of the PDR technician is to repair damage, not cause new damage.

Magnets could be used to secure the vehicle body. Though possible, limitations include the material used to manufacture any portion of the vehicle body the technician wishes to use as a support for the light frame. The process of removing the magnet when it is desired to move the light source may also be problematic. Only ferrimagnetic metals attract magnets. If the vehicle body is not manufactured from iron, steel, cobalt, nickel or manganese, the magnet will not be attracted to the vehicle body. If the body is made of aluminum or some types of stainless steel, magnets will not stick to the body. In some cases, a trim piece, or a bumper, may be the preferred location to support the light though the work done is on a hood or quarter panel nearby. The trim piece may be made of plastic, which is also not attracted by magnets. This inconsistency in materials may make magnets less than optimal as a supporting system.

A more desirable system may be using suction cups. Suction cups work by providing a partial vacuum between the suction cup and the surface to which it is attached. The surface must be relatively smooth. This is usually the case for a vehicle body and PDR work. If the body of the vehicle is mangled, then the part will be replaced, not suitable for a PDR repair of the part.

The negative pressure provided by the vacuum provided by the suction cup may be minimal in that the pressure is multiplied by the surface area covered by the suction cup to give the total force the suction cup provides. A small two-inch diameter suction cup has a surface area of 3.1416 square inches. A four-inch diameter suction cup has a surface area of over 12.5 square inches. So, a 10-psi vacuum with a four-inch suction cup provides 125 pounds of holding force. To remove the suction cup, the user need only vent the suction cup to equalize the pressure, and the holding force virtually instantly drops to zero.

A problem with suction cups is in order to create and maintain a seal with a surface, the material of the suction cup must be pliable. A pliable suction cup means anything that is supported by one suction cup will tend to flex and bend, due to the pliable nature of the suction cup material. So, a light support that has a light cantilevered out from the support base that is mounted by a single suction cup, will likely cause the light portion to move around even though the suction cup is holding the light support securely in one location on the vehicle body. The purpose of the light system is to locate the light in one set location and maintain that relative to the vehicle body. A solution to this problem may be to use two suction cups that are displaced from one another. This creates a large support base that greatly reduces the displacement of the light fixture due to the pliability of the suction cup material.

It should, therefore, be appreciated that there is a need for a more stable dent repair light. Specifically, one that has an extended base and an adjustable frame to assist in providing an infinite positioning capabilities of the lamp relative to the vehicle body. The present invention fulfills this need and others.

SUMMARY OF THE INVENTION

The present invention is a dent repair light which may include a lamp including a light source and a light housing supporting the light source. A support base which may include a base crossbar with two suction cups distally positioned from one another and each of the two suction cups may be movably mounted to the base crossbar about a respective horizontal axis. This may enable rotation of each suction cup around their respective horizontal axis. The base crossbar also support a power supply in electrical communication with the lamp. The invention may also include flexible arm movably mounted to the light housing and connected to the power supply. In this manner, the flexible arm may provide adjustable structural support to the lamp. The flexible arm may also provide support for the electrical communication between the power supply and the lamp.

The invention may also provide the two suction cups being movably mounted to the base crossbar about a respective vertical axis, thus enabling full rotation of each suction cup about their respective vertical axis. The invention may further comprise two cup screw knobs, wherein each of the two suction cups are adjustably secured to the base crossbar about their respective horizontal axis by way of their respective cup screw knob. The power supply may be movably coupled to the base crossbar, wherein the power supply is pivotally coupled to the base crossbar, thereby allowing the power supply to change position relative to the base crossbar. The invention may also include a main screw knob fastening the power supply to the base crossbar, the main screw knob may provide a frictional force between the power supply and the base crossbar to releasably secure the power supply to the base crossbar at different angular orientations.

The power supply may be comprised of a battery receiver and a battery pack. The flexible arm may be comprised of a plurality of individual segments which may fit together allowing more than one degree of freedom of movement between each adjacent segment. More specifically, the flexible arm may include a joint that provides three degrees of freedom of movement between each adjacent segment, such as a ball and socket joint.

The flexible arm may house a wire connection between the power supply and the lamp. The wire may include a slip ring between the lamp and the power supply to allow the wire to rotate freely without excessively twisting the wire when the lamp rotates with respect to the power supply. An alternative to this may include electrical communication between the power supply and the lamp is a wire, such as a coiled wire, wrapped around the flexible arm.

Another option that may be used to prevent the wire housed within the flexible arm is to include a lamp stop on the light housing and a lamp elbow stop on a distal end of the flexible arm, whereby the lamp stop may limit the degree of rotation of the lamp relative to the flexible arm. This combination may limit the movement of the lamp relative to the power supply to prevent excess twisting of a wire used as the electrical communication between the lamp and the power supply. A distal end of the flexible arm may be joined to the light housing by way of a ball and socket joint providing three degrees of freedom of movement between the lamp and the flexible arm.

The invention may also include a lamp including a light source and a light housing supporting the light source. A support base, which may include two suction cups distally positioned from one another and each of the two suction cups may be movably mounted to the support base, each about a respective horizontal axis and a respective vertical axis. Each of the suction cups may provide movement about their respective horizontal axis and full rotation about their respective vertical axis. The support base may also include a power supply in electrical communication with the lamp. A flexible arm may be movably mounted to the light housing and connected to the power supply, whereby the flexible arm may provide adjustable structural support to the lamp, while also providing support for the electrical communication between the power supply and the lamp.

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any of the particular preferred embodiment(s) disclosed.

BRIEF DESCRIPTION OF THE DRAWINGS

Embodiments of the present invention will now be described, by way of example only, with reference to the following drawings, in which.

DETAILED DESCRIPTION OF THE INVENTION

Figure 1:
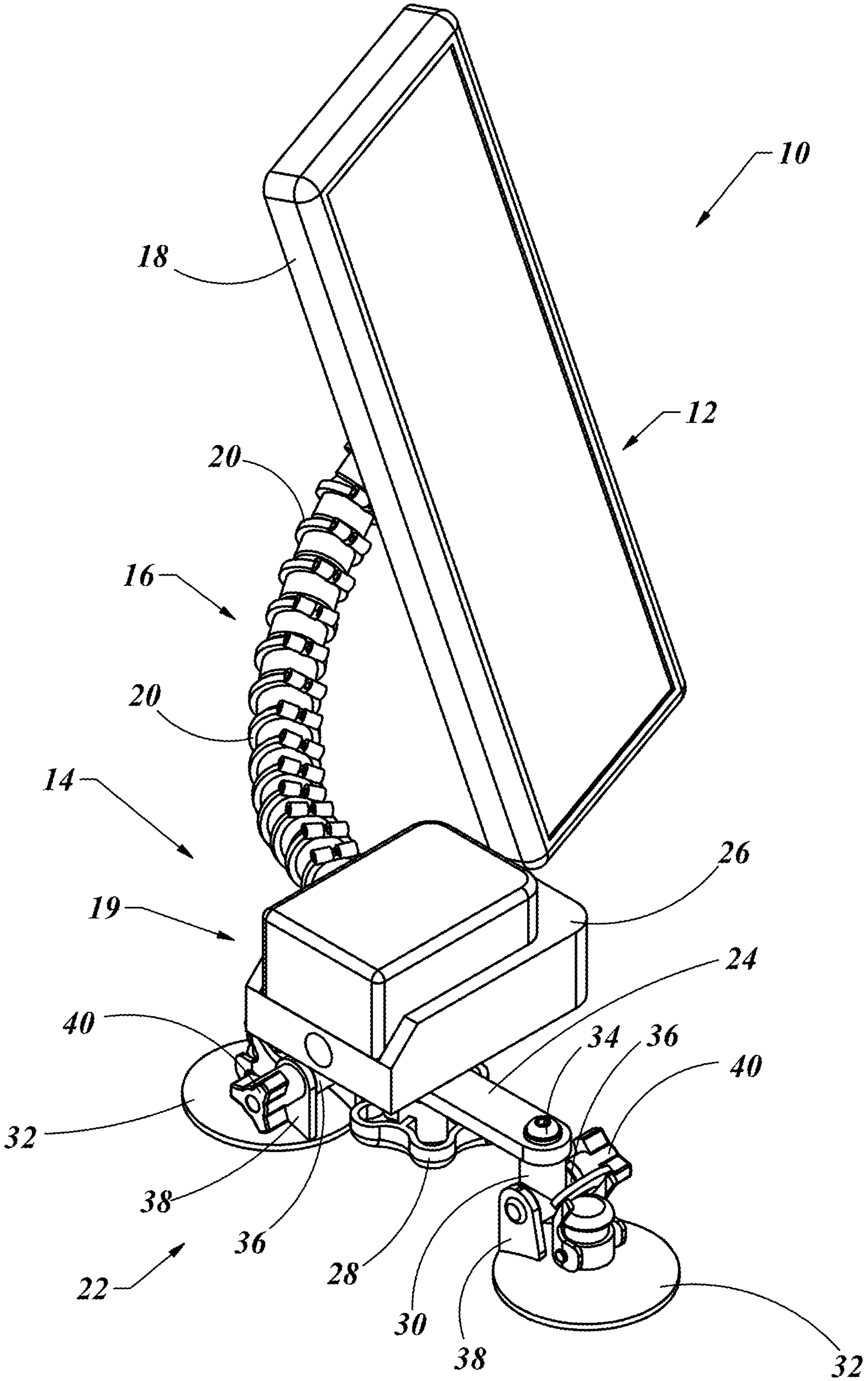
FIG. 1 is an isometric view of a dent repair light from a right rear perspective.

With reference to the illustrative drawings and particularly to FIG. 1, there is shown a dent repair light 10 including a lamp 12 connected to a power supply 14 by way of a flexible arm 16. The lamp 12 may include a light housing 18 which may support a light source such as an LED or incandescent light housed within the light housing 18. The power supply 14 may include a battery pack 19 which may provide electrical power for the lamp 12.

The flexible arm 16 may be comprised of a plurality of individual segments 20, each joined to an adjacent segment while providing a frictional restriction to movement of one segment 20 to the next segment 20. Each segment 20 may be coupled to the adjacent segment 20 by a ball and socket joint, thus allowing for three degrees of freedom of movement of each segment 20 relative to each adjacent segment 20. This restrictive movement of each segment 20 may provide an infinitely adjustable support for the lamp 12 relative to the power supply 14 while still providing enough friction between the segments 20 to have the lamp 12 adjust to and then stay in any position the user places it. This adjustment of the lamp 12 may enable optimal lighting to detect dents on a surface of a vehicle to which the power supply 14 is supported on.

To support the power supply 14 on a vehicle body, a support base 22 may be provided. The support base 22 may include a base crossbar 24 coupled to the power supply 14. The base crossbar 24 may be movably coupled to the power supply 14. In this embodiment, the base crossbar 24 may be pivotally coupled to a battery receiver 26, which may support a battery pack 19, each comprising elements of the power supply 14 and releasably secured the base crossbar 24 in any position by way of a main screw knob 28. The details of this will be presented in more detail below.

The base crossbar 24 may have a cup vertical pivot 30 on each end of the base crossbar 24, with the base crossbar 24 coupled to the battery receiver 26 of the power supply in a center position along the length of the base crossbar 24. The vertical cup pivots 30 may provide support for a suction cup 32 to be positioned on one end of the cup vertical pivot 30. The vertical cup pivot 30 may allow for the associated suction cup 32 to be pivotally coupled to the base crossbar 24 so that the suction cup 32 may be free to rotate about an axis created by the cup vertical pivot 30. A screw 34 may be used to couple the cup vertical support 30 to the base crossbar 24 to provide enough friction to allow the suction cup 32 to rotate about the axis of the cup vertical pivot 30 but remain relatively secure during use.

The cup vertical pivot 30 may include a cup horizontal pivot 36 at an end of the cup vertical pivot 30 that is substantially opposite to the end of the cup vertical pivot 30 that is coupled to the base crossbar 24. The cup horizontal pivot 36 may be substantially orthogonal in orientation to the cup vertical pivot 30. The suction cup 32 may include one or more cup ears 38 which may enable pivotal attachment of the suction cup 32 to the cup horizontal pivot 30. A cup screw knob 40 may be provided along an axis created by the cup horizontal pivot 36 which may provide a frictional force to releasably secure the suction cup 32 to the cup vertical pivot 30 about the cup horizontal pivot 36. This combination may allow the suction cup 32 to be rotated about the cup vertical pivot 30 and rotated about the cup horizontal pivot 36 to give four degrees of freedom of adjustment of each suction cup 32 relative to the base crossbar 40. This combination may provide a great deal of adjustment of the suction cups 32 relative to the power supply 14 to allow for the suction cups 32 to securely mount to a variety of vehicle body contours.

Figure 2:
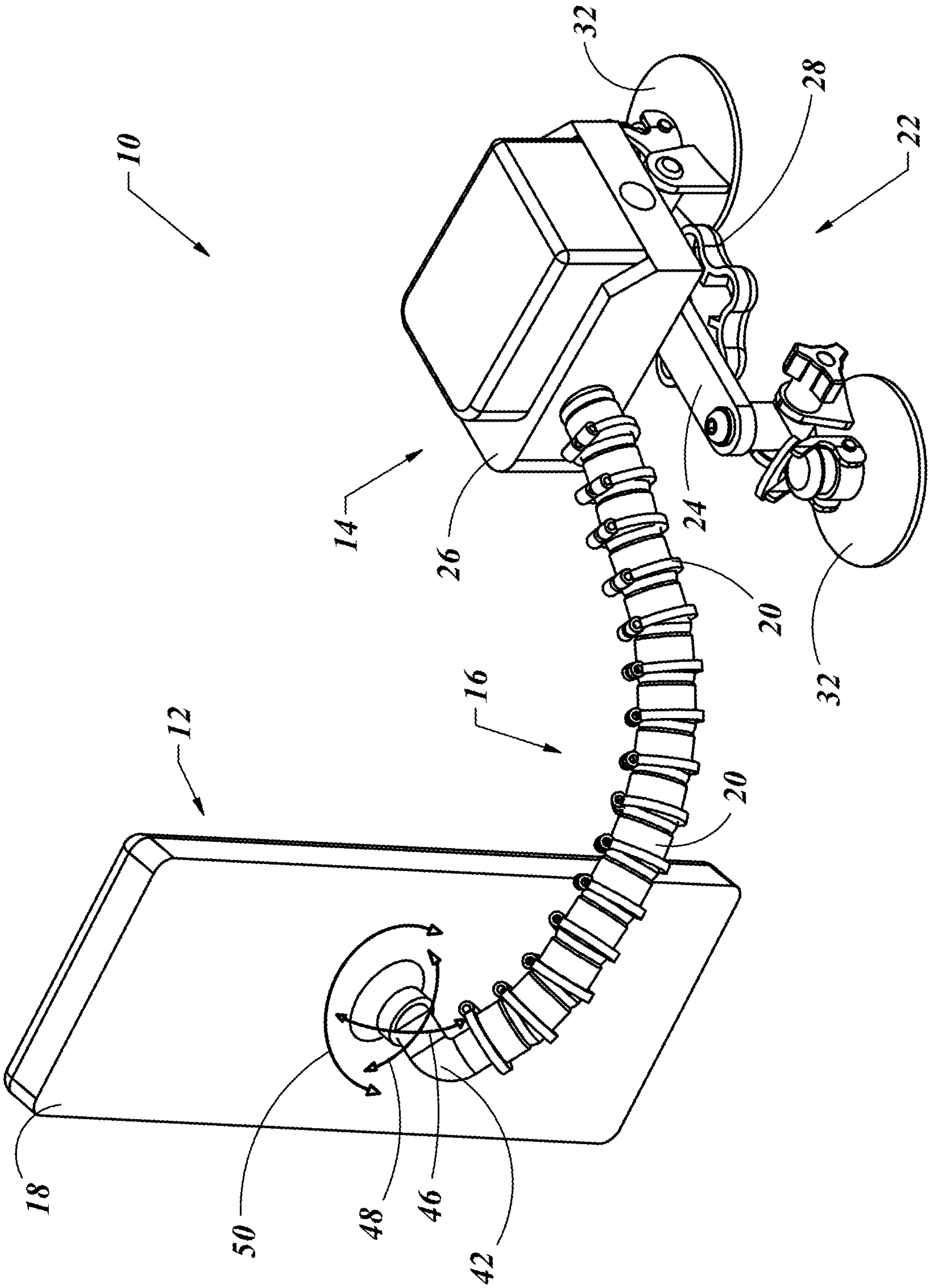
FIG. 2 is an isometric view of the dent repair light of FIG. 1, shown from a left rear perspective.

With reference to FIG. 2, the dent repair light 10 of FIG. 1 is shown in additional detail. From this new angle it is more clearly illustrated that the flexible arm 16 connects the lamp 12 to the power supply 14. The coupling of the flexible arm 16 to the lamp 12 may include a lamp elbow 42 at the distal end of the flexible arm 16. This lamp elbow 42 may include a lamp ball and socket joint 44 which may allow vertical tilting 46, horizontal tilting 48 and lamp rotation 50. These are the three basic degrees of freedom provided by a ball and socket joint, including those which may be provided in the segments of the flexible arm 16.

The flexible connection of the lamp 12 to the power supply 14 may be extremely desirable in terms of positioning the lamp 12 at a precise position relative to a vehicle body. The complication exists in that the power supply 14 and specifically the battery pack 19 as part of the power supply 14, may be heavy in comparison to the weight of the lamp 12. Therefore, it may be desirable to place the power supply 14 near the support base 22 and not near the lamp 12 on the end of the flexible arm 16. Because the power supply 14 must provide the electrical power to the lamp 12, there must be an electrical communication from the power supply 14, by way of the flexible arm 16, to the lamp 12. If the lamp 12 can freely rotate with respect to the support base 22, there could be a problem with any wire that may be positioned within the flexible arm 16 that is used for the electrical communication between the power supply 14 and the lamp 12.

Figure 3:
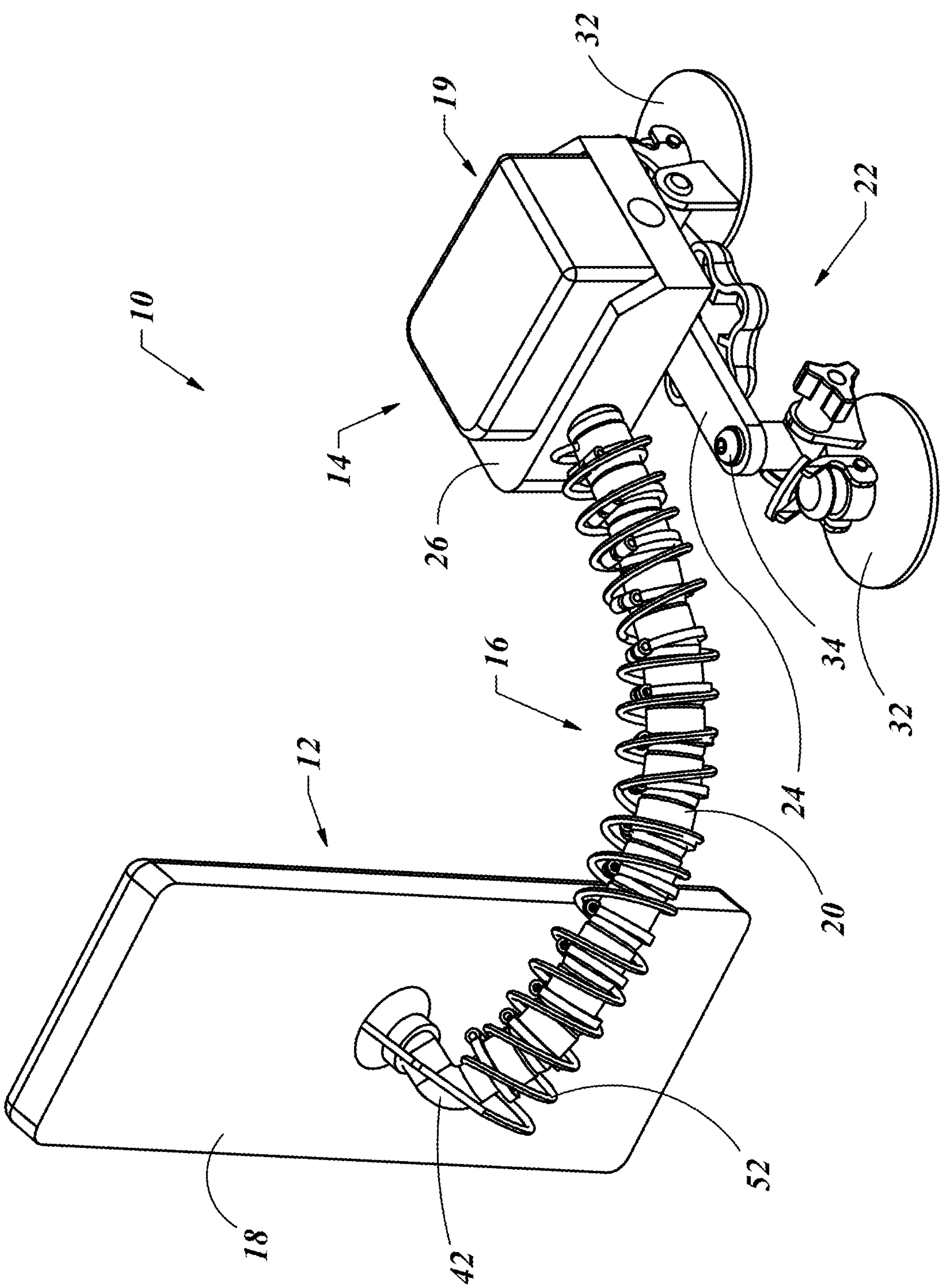
FIG. 3 is an isometric view of the dent repair light of FIG. 2 with an external cord wrapped around the flexible arm.

To solve this potential problem, several solutions are presented in FIGS. 3-6. In FIG. 3 an external electrical cord 52 is shown coiled around the exterior of the flexible arm 16 and connecting the power supply 14 to the lamp 12. By coiling the external electrical cord 52 around the flexible arm 16, the external electrical cord 52 may be able to undergo several rotations of the lamp 12 relative to the power supply 14 with minimal stress on the external electrical cord 52. In addition, by placing the external electrical cord 52 on the outside of the flexible arm 16, the external electrical cord 52 is visible to the user. If the external electrical cord 52 becomes coiled too tightly onto the flexible arm 16, the user may likely feel the increase in tension and then visibly see the external electrical cord 52 being positioned tight against the surface of the flexible arm 16. The user can then unwind the external electrical cord 52 by rotating the lamp 12 a few rotations to remedy the potential problem before any excessive stress is placed on the external electrical cord 52. The negative side to this solution is the external electrical cord 52 is exposed and therefore potentially subject to other damage from debris, tools or other potential hazards.

Figure 4:
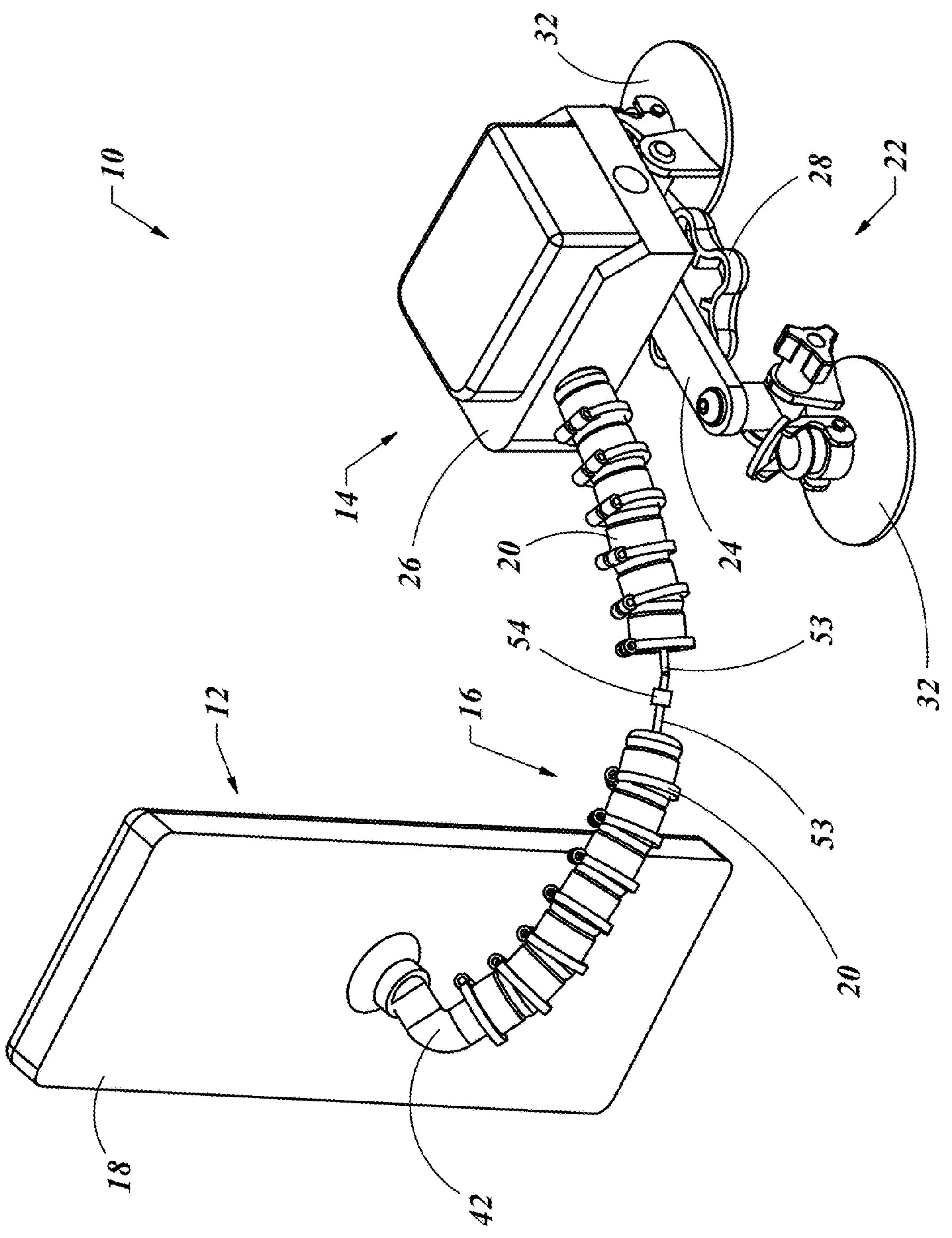
FIG. 4 is an isometric view of the dent repair light of FIG. 2, with some of the segments removed to show a slip ring on a wire connecting the power supply to the lamp.

An alternative solution is shown in FIG. 4. Here an internal electrical cord 53 is positioned within an open cavity of the flexible arm 16 (shown here with two of the segments removed). The internal electrical cord 53 may include a slip ring 54 positioned on the internal electrical cord 53. A slip ring is an electrical connector that allows for rotation of the wire on one side of the slip ring 54 relative to the other side of the slip ring 54, while maintaining electrical communication between the wires on each side of the slip ring 54. This may allow the lamp 12 to "helicopter" or rotate freely about the lamp elbow 42 joint at the lamp 12 without causing damage to the internal electrical cord 53 because it may not twist up in a knot and break. The problem with this is if the slip ring 54 fails to do its job for any reason, as it is an electromechanical device that is subject to wear, moisture and contamination, the wire can become twisted and break. This will cause the dent repair light 10 to stop working with no clear visible reason for the failure, making a more expensive repair and an unhappy customer that his light happened to stop working.

Figure 6:
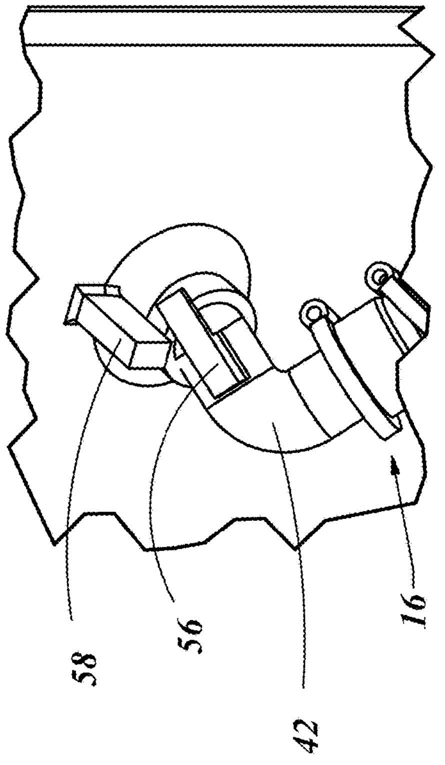
FIG. 6 is a sectioned view of a portion of the lamp cut along line 6-6 in FIG. 5, showing the lamp stop and the lamp elbow stop.
Figure 5:
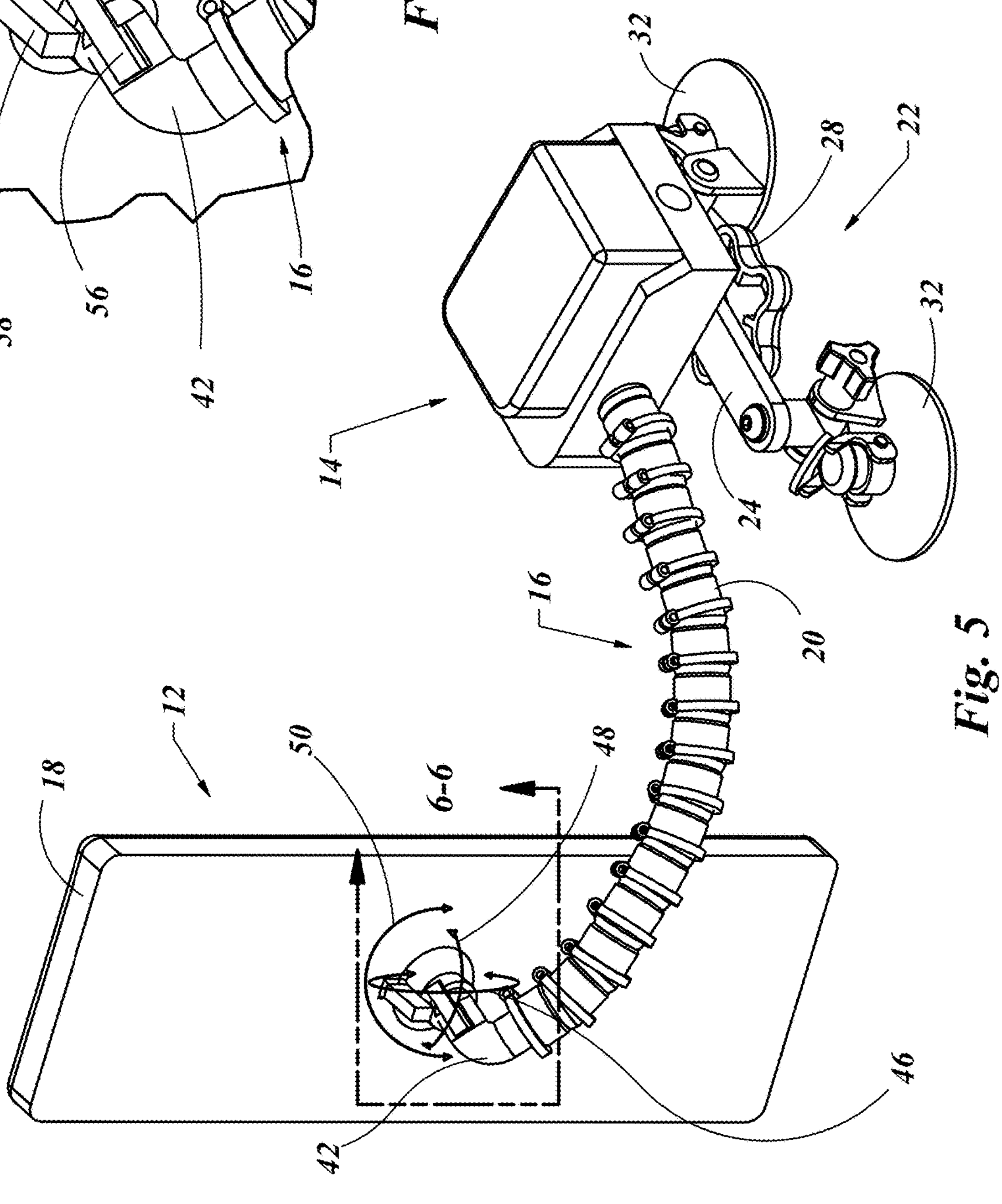
FIG. 5 is an isometric view of the dent repair light of FIG. 2 showing the adjustment of the lamp relative to the segmented arm.

A third solution is presented in FIGS. 5-6. Here the flexible arm 16 connects the power supply 14 to the lamp 12 only here the lamp elbow 42 has been modified to include a lamp elbow stop 56 and the light housing 18 has been modified to include a lamp stop 58. The lamp 12 may rotate about the lamp elbow 42 with the same degrees of freedom as previously noted, only the lamp rotation 50 is restricted to slightly less than 360° of rotation. This means the lamp 12 may move into any position, but if an angle of rotation is desired that is greater than allowed due to the lamp elbow stop 56 contacting the lamp stop 58, the flexible arm 16 will flex to make up the difference. If further rotation is desired, the user may reverse the direction of rotation of the lamp 12, thereby moving the lamp elbow stop 56 away from the lamp stop 58. If the lamp 23 is rotated 180° in the opposite direction, the light placed on the vehicle body may be the same, so the lamp does not need to rotate over 360°. Restricting the rotation of the lamp 12 relative to the flexible arm 16 prevents the lamp 12 from "helicoptering" and twisting an internal electrical cord 53 that may be placed inside of the flexible arm 16, thereby eliminating the need for a slip ring 54 (FIG. 4).

Figure 7:
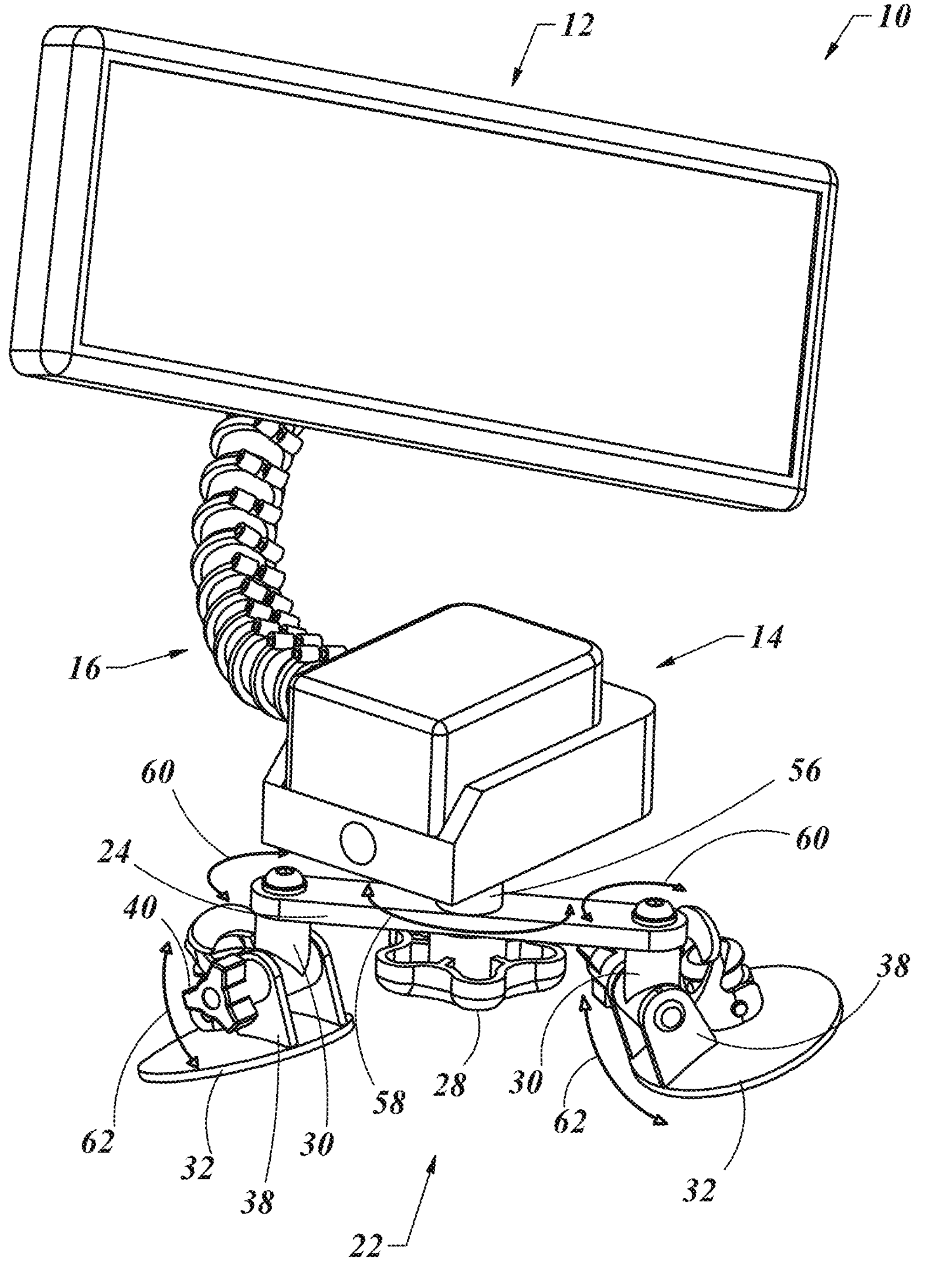
FIG. 7 is a detail view of the dent repair light of FIG. 1, showing the movement of the suction cups and the power supply relative to the support base.
Figure 8:
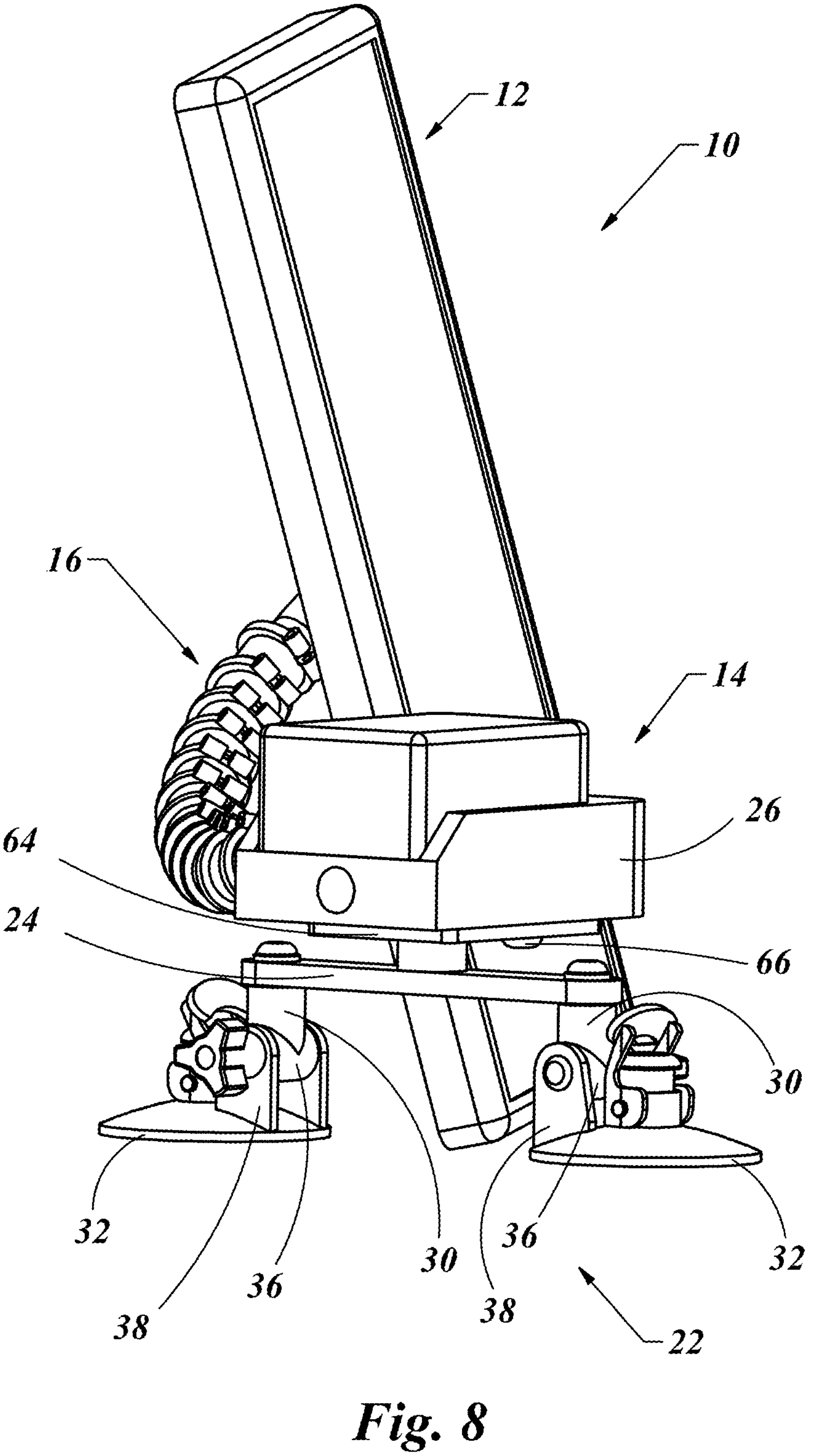
FIG. 8 is an isometric view of an alternative embodiment of the dent repair light as shown in FIG. 1, where the base crossbar is securely mounted to the base plate supporting the power supply.

The full freedom of movement and adjustment of the support base 22 is shown in FIG. 7 and by contrast an embodiment that is less adjustable is shown in FIG. 8. The system as previously disclosed is shown in FIG. 7, where the base crossbar 24 may be pivotally coupled to the power supply 14. The main screw knob 28 may be used to clamp a power supply sleeve 56, which may include female threads. The main screw knob 28 may have a male threaded portion (not shown) that extends through a hole in the base crossbar 24, so that when the main screw knob 28 is tightened into the power supply sleeve 56, the base crossbar 24 may be captured there between. Friction may releasably secure the base crossbar 24 in any position relative to the power supply 14, as noted by the battery rotation arrow 58. In a similar manner, the cup vertical pivots 30 may allow for rotation as noted by cup rotation arrow 60. Finally, the cup horizontal pivots 36 may allow for rotation of the suction cups 32 as noted by the cup tilt arrows 62. The cup screw knobs 40 may allow for selective adjustment of the suction cups 32 as noted by the cup tilt arrows 62, and secure the suction cups 32 in a specific orientation by tightening the cup screw knobs 40.

The embodiment of the present invention as shown in FIG. 8 is very similar with the exception that the base crossbar 24 may be rigidly attached to a base plate 64. The base plate may be rigidly fixed to the battery receiver 26 of the power supply 14 by base screws 66. The suction cups 32 may still rotate and tilt as noted previously. A reduction in the number of adjustments in some cases, may be desired. If the reduced number of adjustments still allows a user to fix the dent repair light 10 to a vehicle body and adjust the lamp 12 to the proper position to illuminate dents in the vehicle body, then any additional adjustments are unnecessary and therefore add additional cost and complexity to the dent repair light 10. Also, any adjustment may come loose. That means if the lamp 12 is set in place and a locking adjustment fails or slips, the lamp 12 may now have to be readjusted. This takes time away from the technician using the dent repair light 10. So, if any adjustments are deemed unnecessary, they may very well be best eliminated. Such is the possible case in this embodiment where the base crossbar 24 is set in a specific orientation to the power supply 14.

The foregoing detailed description of the present invention is provided for purpose of illustration, and it is not intended to be exhaustive or to limit the invention to the embodiments shown. The embodiments may provide different capabilities and benefits, depending on the configuration used to implement key features of the invention.

What is claimed is:

1. A dent repair light, comprising:

a lamp including a light source and a light housing supporting the light source;

a support base including a base crossbar with two suction cups distally positioned from one another and each of the two suction cups movably mounted to the base crossbar about a respective horizontal axis, enabling rotation of each suction cup around their respective horizontal axis, the base crossbar also supporting a power supply in electrical communication with the lamp; and a flexible arm movably mounted to the light housing and connected to the power supply, whereby the flexible arm provides adjustable structural support to the lamp, the flexible arm also providing support for the electrical communication between the power supply and the lamp.

2. The dent repair light according to claim 1, wherein the two suction cups are movably mounted to the base crossbar about a respective vertical axis enabling full rotation of each suction cup about their respective vertical axis.

3. The dent repair light according to claim 1, further comprising two cup screw knobs, wherein each of the two suction cups are adjustably secured to the base crossbar about their respective horizontal axis by way of their respective cup screw knob.

4. The dent repair light according to claim 1, wherein the power supply is movably coupled to the base crossbar.

5. The dent repair light according to claim 1, wherein the power supply is pivotally coupled to the base crossbar, thereby allowing the power supply to change angular orientation relative to the base crossbar.

6. The dent repair light according to claim 5, further comprising a main screw knob fastening the power supply to the base crossbar, the main screw knob providing a frictional force between the power supply and the base crossbar to releasably secure the power supply to the base crossbar at different positions.

7. The dent repair light according to claim 1, wherein the power supply is comprised of a battery receiver and a battery pack.

8. The dent repair light according to claim 1, wherein the flexible arm is comprised of a plurality of individual segments fit together allowing more than one degree of freedom of movement between each adjacent segment.

9. The dent repair light according to claim 8, wherein each segment of the flexible arm includes a joint that allows three degrees of freedom of movement between each adjacent segment.

10. The dent repair light according to claim 9, wherein the joint that allows for three degrees of freedom is a ball and socket joint.

11. The dent repair light according to claim 1, wherein the flexible arm houses a wire connection between the power supply and the lamp.

12. The dent repair light according to claim 11, wherein the wire includes a slip ring between the lamp and the power supply to allow the wire to rotate freely without excessively twisting the wire when the lamp rotates with respect to the power supply.

13. The dent repair light according to claim 1, wherein the electrical communication between the power supply and the lamp is a wire wrapped around the flexible arm.

14. The dent repair light according to claim 13, wherein the wire wrapped around the flexible arm is a coiled wire.

15. The dent repair light according to claim 1, further comprising a lamp stop on the light housing and a lamp elbow stop on a distal end of the flexible arm, whereby the lamp stop limits the degree of rotation of the lamp relative to the flexible arm, thus limiting the movement of the lamp relative to the power supply to prevent excess twisting of a wire used as the electrical communication between the lamp and the power supply.

16. The dent repair light according to claim 1, wherein a distal end of the flexible arm is joined to the light housing by way of a ball and socket joint providing three degrees of freedom of movement between the lamp and the flexible arm.

17. A vehicle dent repair light comprising:

a lamp including a light source and a light housing supporting the light source;

a support base including two suction cups distally positioned from one another and each of the two suction cups movably mounted to the support base, each about a respective horizontal axis and a respective vertical axis, each of the suction cups providing movement about their respective horizontal axis and full rotation about their respective vertical axis, the support base also including a power supply in electrical communication with the lamp; and a flexible arm movably mounted to the light housing and connected to the power supply, whereby the flexible arm provides adjustable structural support to the lamp, the flexible arm also providing support for the electrical communication between the power supply and the lamp.

18. The dent repair light according to claim 17, wherein the support base is further comprised of a base crossbar that supports the two suction cups and is movably coupled to the power supply, thereby enabling rotation of the power supply relative to the suction cups.

19. The dent repair light according to claim 18, further comprising a main screw knob fastening the power supply to the base crossbar, the main screw knob providing a frictional force between the power supply and the base crossbar to releasably secure the power supply to the base crossbar at different angular orientations.

20. The dent repair light according to claim 17, further comprising two cup screw knobs, wherein each of the two suction cups are adjustably secured to the base crossbar about their respective horizontal axis by way of their respective cup screw knob.

* * * * *